G. J. GENEBACH.
POULTRY CRATE.
APPLICATION FILED JULY 3, 1920.
1,352,444.
Patented Sept. 14, 1920.
2 SHEETS—SHEET 1.
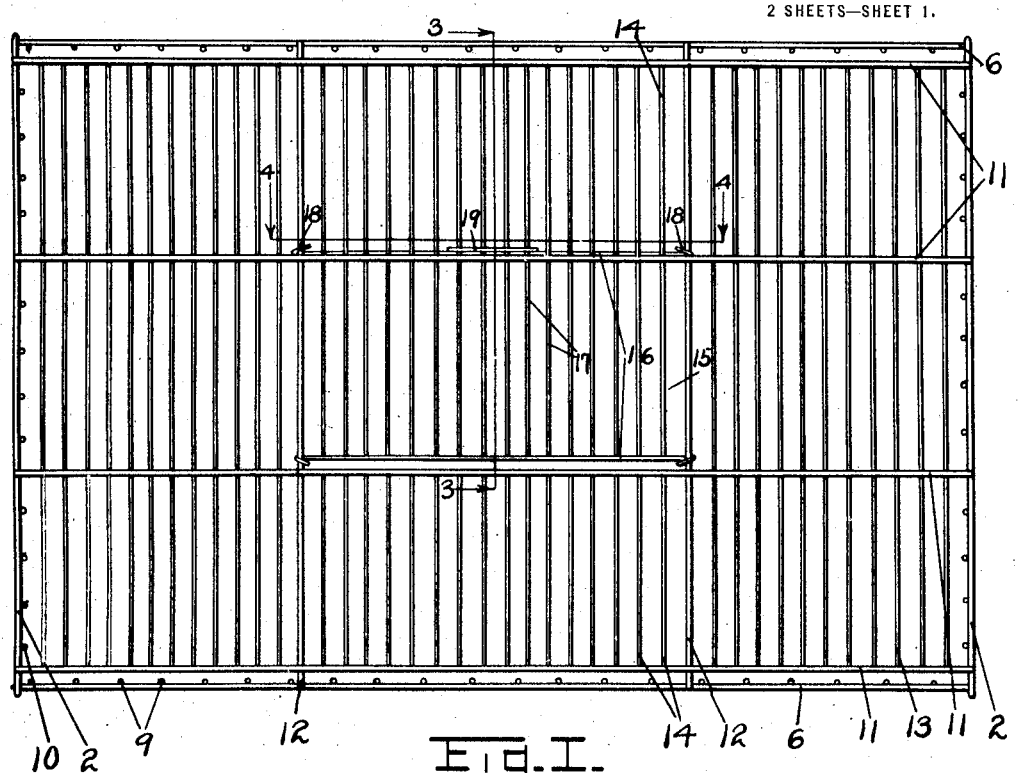
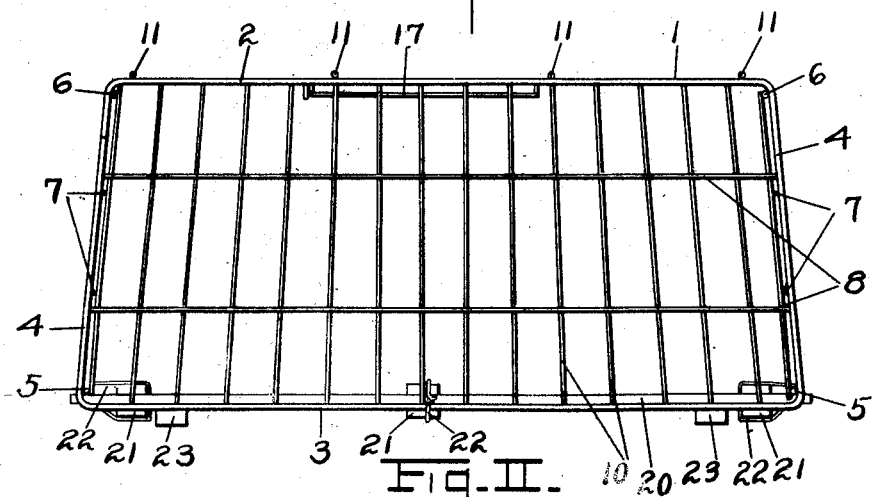
Witnesses
Fred Ullrich
M. Louise Thurston
Inventor
George J. Genebach
By Chappell & Earl
Attorneys

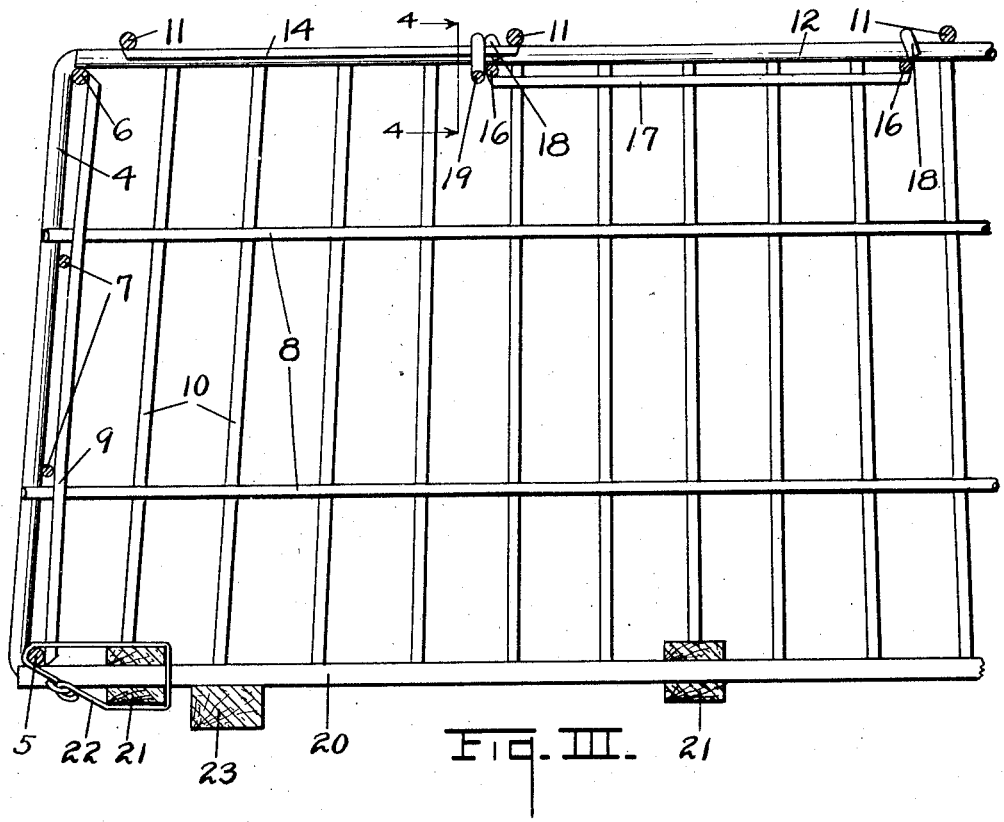
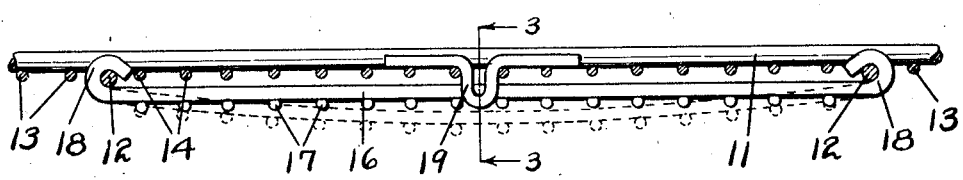
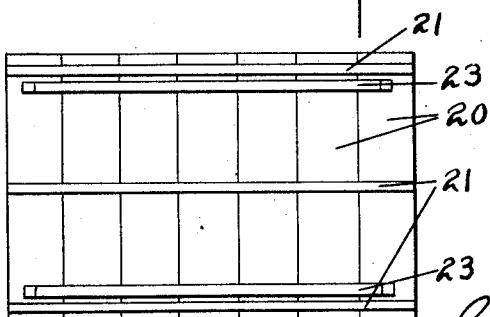

UNITED STATES PATENT OFFICE.

GEORGE J. GENEBACH, OF BATTLE CREEK, MICHIGAN, ASSIGNOR TO UNITED STEEL AND WIRE CO., OF BATTLE CREEK, MICHIGAN, A CORPORATION OF MICHIGAN.

POULTRY-CRATE.

1,352,444.

Specification of Letters Patent.   Patented Sept. 14, 1920.

Application filed July 3, 1920.   Serial No. 393,926.

*To all whom it may concern:*

Be it known that I, GEORGE J. GENEBACH, a citizen of the United States, residing at Battle Creek, county of Calhoun, State of Michigan, have invented certain new and useful Improvements in Poultry-Crates, of which the following is a specification.

This invention relates to improvements in poultry crates.

My improved poultry crate is especially designed by me as a shipping crate although it is desirable for general use for the handling of poultry.

The main objects of this invention are:

First, to provide an improved shipping crate which with the exception of the bottom is constructed entirely of metal, one which is light in weight and is at the same time very strong and durable, and capable of withstanding severe usage and strains and stresses.

Second, to provide an improved crate which permits the nesting of a number of crates for convenience in storage or shipping.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a top plan view of my improved crate with the bottom omitted.

Fig. II is an end view with the bottom in position.

Fig. III is a detail transverse section on a line corresponding to line 3—3 of Figs. I and IV.

Fig. IV is a detail section on a line corresponding to line 4—4 of Figs. I and III, showing details of the door, the manner of engaging and releasing the door being indicated by dotted lines.

Fig. V is a plan view of the bottom.

In the drawings, similar reference characters refer to similar parts throughout the several views, and the sectional views are taken looking in the direction of the little arrows at the ends of the section lines.

Referring to the drawing, my improved poultry crate comprises end members 1—1 each having top bars 2, bottom bars 3 and uprights 4. These top and bottom upright bars are formed as a continuous member, being formed of a rod bent into shape and the ends of the rods electrically welded together.

The bottom side bars 5 and the top side bars 6 are arranged on the inner sides of the uprights 4 of the end members. The intermediate side bars 7 and intermediate end bars 8 are arranged on the inner sides of the uprights 4. The side and end slats 9 and 10 are disposed vertically on the inner sides of the side and end bars. The top longitudinal bars 11 are arranged on the outer sides of the top end bars 2.

The top cross bars 12 are arranged below the top longitudinal bars 11 with their ends resting upon the side top bars 6. The top slats 13 are disposed below the top longitudinal bars. The top slats 14 between the top cross bars 12 terminate at the intermediate bars to provide a door opening 15 at the door at the center of the top.

I provide a door consisting of the longitudinal or slide bars 16 with the cross slats 17 secured thereto. The bars 16 have eyes 18 at their ends slidably engaging the top cross bars 12 so that the door may slide under the top, the eyes of one of the bars 16 of the door are engaged with the cross bars at the outer side of one of the intermediate longitudinal bars, and the eyes of the other are engaged on the inner side thereof as shown in Fig. I.

Thus arranged, the door is supported so that it slides under the top and is not likely to be distorted or bent so that it will not slide to open and close freely. For retaining the door in closed position, I provide a keeper 19 which is mounted on the top slats to project downwardly into the path of one of the door slide bars. This slide bar may be sprung downwardly to permit it to pass the keeper as indicated by the dotted lines in Fig. IV.

The several parts are spot welded at their points of crossing. The bottom is preferably formed of boards 20 and longitudinal cleats 21, and is secured to the bottom pieces of the crate by means of the wires 22. Supports or shoes 23 are secured to the bottom to serve as supports and runners and also to strengthen the bottom. The shoes or supports 23 are arranged so that when the crates are stacked, these lie between the outer top bars 11 and thus prevent the crate from sliding off. This enables the effective stacking of the crates. The shoes are beveled at their ends as indicated.

The crates taper toward the top so that when the bottoms are removed a plurality of crates may be nested together for shipment, the bottoms being tied or otherwise secured together in bundles.

My improved crate is very strong and rigid, the bars and slats being electrically welded so that they are effectively braced in all directions and may be formed of comparatively light material and at the same time they are capable of withstanding the severe strains and usage to which they are subjected in transportation and handling.

The side and ends bars are arranged in the inner sides of the end member uprights so that they are not likely to be knocked off by contact with the exterior objects and they cannot be pushed out from the inside, and the several parts are assembled so that should one part become loosened it is not likely to become misplaced so as to permit the escape of the fowls. The top bars 11 are disposed so that when loads are placed on the crates, as when one crate is placed upon another, the weight does not loosen the bars. The parts are arranged so that there is a coacting bracing relation and as stated, may be made of light material and still be strong and rigid. The door is accessible and easily manipulated and at the same time is very secure when closed.

Having thus described my invention, what I claim as new and desire to secure by Letters Patent, is:

1. A poultry crate comprising a pair of end members each having top, bottom and upright bars formed as a continuous member, top and bottom and intermediate side bars and top and bottom end bars disposed on the inner sides of the upright bars of said end members, side and end slats disposed vertically on the inner sides of said side and end bars, top longitudinal bars disposed on the upper sides of the top end bars, and top cross bars and slats disposed on the under sides of the top longitudinal bars, said top cross bars resting upon the top side bars, said several bars and slats being welded together at their meeting points.

2. A poultry crate comprising a pair of end members each having top, bottom and upright bars formed as a continuous member, top and bottom side bars disposed in the angles of said end members, side and end intermediate bars disposed on the upright bars of said end members, side and end slats disposed vertically on the inner sides of said side and end bars, top longitudinal bars disposed on the upper sides of the top end bars, and top cross bars and slats disposed on the under sides of the top longitudinal bars.

3. A poultry crate comprising a pair of end members each having top, bottom and upright bars formed as a continuous member, top and bottom and intermediate side bars disposed on the upright bars of said end members, end intermediate bars disposed on the upright bars of said end members, side and end slats disposed vertically on the side and end bars, top longitudinal bars disposed on the top end bars, and top cross bars and slats disposed on the under sides of the top longitudinal bars, said several bars and slats being welded together at their meeting points.

4. A poultry crate comprising end members each having top, bottom and upright bars formed as a continuous member, side top bars disposed in the angles of the end top and upright bars, top longitudinal bars disposed on the top end bars, a pair of spaced cross bars disposed below said top longitudinal bars with their ends resting upon the top side bars, top slats disposed on the under sides of said top longitudinal bars, the slats being omitted between the inner longitudinal bars and said cross top bars providing a door opening, a door comprising a pair of longitudinal bars and slats welded on the under sides thereof, said longitudinal bars having eyes on their ends slidably engaging said top cross bars, the outer longitudinal door bars being engaged with the cross bars at the outer side of one of the intermediate top bars and the inner longitudinal door bars being engaged with the cross bars on the inner side of such longitudinal top bar so that the door is supported for sliding movement, and a downwardly projecting keeper mounted on the top slats so that the end bar of the longitudinal door bars may be sprung over the same to hold the door in its closed portion.

5. A poultry crate comprising end members each having top, bottom and upright bars formed as a continuous member, side top bars disposed in the angles of the end top and upright bars, top longitudinal bars disposed on the top end bars, a pair of spaced cross bars disposed below said top longitudinal bars with their ends resting upon the top side bars, top slats disposed on the under sides of said top longitudinal bars, the slats being omitted between the inner longitudinal bars and said cross top bars providing a door opening, and a door comprising a pair of longitudinal bars and slats welded on the under sides thereof, said longitudinal bars having eyes on their ends slidably engaging said top cross bars, the outer longitudinal door bars being engaged with the cross bars at the outer side of one of the intermediate top bars and the inner longitudinal door bars being engaged with the cross bars on the inner side of such longitudinal top bar so that the door is supported for sliding movement.

6. A poultry crate comprising top longitudinal side and intermediate bars, top slats secured thereto, a portion of the top slats terminating at the intermediate top bars providing a door opening between the same, and a door comprising a pair of longitudinal bars disposed on the under side of the top slats and slats welded thereto, said longitudinal door bars having upturned eyes at their ends slidably engaged with top slats so that the door is slidably supported, there being a downwardly projecting keeper at one side of the door opening with which the rear longitudinal bar of the door may be sprung into engagement.

7. A poultry case comprising top longitudinal side and intermediate bars, top slats secured thereto, a portion of the top slats terminating at the intermediate top bars providing a door opening between the same, and a door comprising a pair of longitudinal bars disposed on the under side of the top slats and slats welded thereto, said longitudinal door bars having upturned eyes at their ends slidably engaged with top slats so that the door is slidably supported.

In witness whereof, I have hereunto set my hand and seal in the presence of two witnesses.

GEORGE J. GENEBACH. [L. S.]

Witnesses:
C. G. GENEBACH,
CATHERINE TOBIN.